(12) United States Patent
Mallary

(10) Patent No.: US 7,593,305 B1
(45) Date of Patent: Sep. 22, 2009

(54) REMOVING SPHERICAL ABERRATIONS FOR TWO PHOTON RECORDING

(75) Inventor: Michael Mallary, Sterling, MA (US)

(73) Assignee: Seagate Technology LLC, Scotts Valley, CA (US)

(*) Notice: Subject to any disclaimer, the term of this patent is extended or adjusted under 35 U.S.C. 154(b) by 672 days.

(21) Appl. No.: 11/352,691

(22) Filed: Feb. 13, 2006

Related U.S. Application Data

(60) Provisional application No. 60/716,008, filed on Sep. 9, 2005.

(51) Int. Cl.
*G11B 7/00* (2006.01)

(52) U.S. Cl. ............................. 369/112.01; 369/112.26
(58) Field of Classification Search ............ 369/112.01, 369/112.09, 112.14, 112.21, 112.28, 44.23, 369/44.24, 112.22
See application file for complete search history.

(56) References Cited

U.S. PATENT DOCUMENTS

| | | | |
|---|---|---|---|
| 3,582,814 A | 6/1971 | Duguay | |
| 4,021,217 A | 5/1977 | Bondybey et al. | |
| 4,044,252 A | 8/1977 | Rentzepis | |
| 4,209,690 A | 6/1980 | Rentzepis | |
| 4,376,303 A | 3/1983 | Lurie | |
| 4,712,887 A | 12/1987 | Baer | |
| 4,826,270 A | 5/1989 | Opheij et al. | |
| 4,918,679 A | 4/1990 | Opheij et al. | |
| 5,042,058 A | 8/1991 | Rentzepis | |
| 5,157,555 A | 10/1992 | Reno | |
| 5,202,875 A | 4/1993 | Rosen et al. | |
| 5,251,198 A | 10/1993 | Strickler | |
| 5,268,862 A | 12/1993 | Rentzepis | |
| 5,325,324 A | 6/1994 | Rentzepis et al. | |
| 5,349,471 A | 9/1994 | Morris et al. | |
| 5,381,401 A | 1/1995 | Best et al. | |
| 5,426,686 A | 6/1995 | Rentzepis et al. | |
| 5,487,060 A | 1/1996 | Rosen et al. | |
| 5,625,609 A | 4/1997 | Latta et al. | |

(Continued)

OTHER PUBLICATIONS

Dvornikov et al., "Materials and Systems for Two Photon 3-D ROM Devices", IEEE Transactions on Components, Packaging, and Manufacturing Technology-Part A, vol. 20, pp. 203-212, 1997.

(Continued)

*Primary Examiner*—Nabil Z Hindi
(74) *Attorney, Agent, or Firm*—Cesari and McKenna, LLP; Patricia A. Sheehan

(57) ABSTRACT

A system and method is provided for adjusting a depth of focus in a refractive material without introducing spherical aberration as a result of the focal adjustment. The system and method provide a novel optical path in which a ramped prism is situated between an objective lens and a refractive material. The bottom surface of the prism is positioned parallel to and in close proximity with the top surface of the recording medium. The objective lens and, as appropriate, one or more associated mirrors are positioned so that light exiting the lens is directed along an optic axis that is oriented substantially perpendicular with respect to the ramped top surface of the prism. In operation, light passes through the objective lens and is focused at a fixed optical depth in the refractive block consisting of the prism and recording medium. The objective lens and other optics in the optical path may be moved up or down the prism ramp to adjust the physical depth of focus in the recording medium. Since the optical depth of focus in the refractive block remains constant, additional spherical aberration is not introduced as a result of changing the physical focal depth in the recording medium.

16 Claims, 9 Drawing Sheets

U.S. PATENT DOCUMENTS

| | | | |
|---|---|---|---|
| 5,666,344 | A | 9/1997 | Imaino et al. |
| 5,677,903 | A | 10/1997 | Holtslag et al. |
| 5,754,513 | A | 5/1998 | Yagi et al. |
| 5,838,653 | A | 11/1998 | Fan et al. |
| 5,841,753 | A | 11/1998 | Holtslag et al. |
| 5,920,532 | A | 7/1999 | Yagi et al. |
| 5,930,331 | A | 7/1999 | Rentzepis et al. |
| 5,995,292 | A | 11/1999 | McDonald |
| 6,005,838 | A | 12/1999 | Fan et al. |
| 6,014,359 | A | 1/2000 | Nagano |
| 6,020,985 | A | 2/2000 | McLeod et al. |
| 6,094,410 | A | 7/2000 | Fan et al. |
| 6,115,192 | A | 9/2000 | McDonald |
| 6,147,782 | A | 11/2000 | Daiber et al. |
| 6,212,148 | B1 | 4/2001 | Hesselink et al. |
| 6,363,038 | B1 | 3/2002 | Yanagawa |
| 6,432,610 | B1 | 8/2002 | Rentzepis et al. |
| 6,483,735 | B1 | 11/2002 | Rentzepis et al. |
| 6,498,775 | B1 | 12/2002 | Fan et al. |
| 6,574,174 | B2 | 6/2003 | Amble et al. |
| 6,590,852 | B1 | 7/2003 | McCormick, Jr. |
| 6,608,774 | B1 | 8/2003 | Rentzepis et al. |
| 6,693,201 | B1 | 2/2004 | Rentzepis et al. |
| 6,731,431 | B2 | 5/2004 | Sekine |
| 6,731,434 | B1 | 5/2004 | Hua et al. |
| 6,760,295 | B1 | 7/2004 | Maruyama |
| 6,795,248 | B2 | 9/2004 | Kimura |
| 7,145,844 | B2 * | 12/2006 | Nagashima et al. ...... 369/44.23 |
| 2003/0043462 | A1 | 3/2003 | Sekine |
| 2003/0073031 | A1 | 4/2003 | Rentzepis et al. |
| 2003/0133391 | A1 | 7/2003 | Holtslag et al. |
| 2003/0235136 | A1 | 12/2003 | Akselrod et al. |

OTHER PUBLICATIONS

Y. Zhang et al., "Characterization of bit-wise volumetric storage medium for a space environment" Optics Express 2662, vol. 12, No. 12, Jun. 14, 2004.

"Long Term Technology Push", WTEC Hyper-Librarian, Jun. 1999, <http://www.wtec.org/loyola/hdmem/07_03.htm>.

"Emerging Optical Storage Technologies", WTEC Hyper-Librarian, Feb. 1996, <http://www.wtec.org/loyola/opto/c3_s5.htm>.

Esener et al., WTEC Panel Report on "The Future of Data Storage Technologies", International Technology Research Institute, World Technology (WTEC) Division, Jun. 1999.

Milster et al., "Objective lens design for multiple-layer optical data storage", Society of Photo-Optical Instrumentation Engineers, pp. 295-301, 1999.

Walker, EP; Zhang, Y.; Dvornikov, A., et al., "Two-photon Volumetric Optical Disk Storage Systems: Experimental Results and Potentials," Found in Optics in Computing (OC). vol. 90 of *OSA Trends in Optics and Photonics*, paper OFB2, Jun. 15, 2003, pp. 1-3.

Zhang, H; Walker, EP; Feng, W., et al., "Multi-layer Optical Data Storage Based on Two-photon Recordable Fluorescent Disk Media," Paper appears in: Eighteen IEEE Symposium on Mass Storage Systems and Technologies, 2001 (MSS '01), Apr. 2001, pp. 1-12.

Esen, R. S.; Walker, EP; Zhang, Y, et al., "Present Performance and Future Directions in Two-photon Addressed Volumetric Optical Disk Storage Systems," Proceedings of SPIE, Vol. 4988, Jul. 28, 2003, pp. 1-11.

* cited by examiner

REMOVING SPHERICAL ABERRATIONS FOR TWO PHOTON RECORDING

CROSS-REFERENCE TO RELATED APPLICATION

The present application claims the benefit of U.S. Provisional Patent Application Ser. No. 60/716,008, entitled Removing Spherical Aberrations for Two Photon Recording, which provisional patent application was filed on Sep. 9, 2005 by Michael Mallary and is hereby incorporated by reference as though fully set forth herein.

FIELD OF THE INVENTION

This invention relates generally to removing spherical aberration when making focal adjustments in an optical system, and, more specifically, to a novel system and method for adjusting a depth of focus without introducing additional spherical aberration as a result of the focal adjustment.

BACKGROUND OF THE INVENTION

Conventional longitudinal magnetic recording is expected to support areal densities of up to around 100 gigabits per square inch before magnetizations in the longitudinal recording media become thermally unstable. Perpendicular magnetic recording media is more thermally stable at higher recording frequencies and is expected to support recording densities of up to around 500 gigabits per square inch. A further increase in areal density, e.g., by a factor of two or three, may be realized by patterning the perpendicular media. However, for densities above that, optical recording will become an attractive alternative to magnetic recording. For instance, effective areal densities exceeding a terabit per square inch should be possible using bitwise volumetric optical data storage. In this context, the effective areal density is the number of bits stored in a volume divided by a surface area on which the volume is projected. Thus, an optical storage medium that stores N layers of recorded data at M bits per square inch per layer has an effective areal density of N*M bits per square inch.

Two-photon recording is an example of a promising bitwise volumetric optical recording technique that may eventually replace conventional magnetic recording. According to this technique, data is recorded by irradiating a selected region of a two-photon recording medium with first and second laser beams. The first and second beams may be intersecting continuous-wave laser beams or high-intensity pulses that are focused in close temporal and spatial proximity to each other in the recording medium. The combined energy of the first and second beams typically changes the molecular or crystalline structure of the irradiated region so that the region will subsequently fluoresce when excited with a readout laser beam of a suitable wavelength. For instance, the recording medium may be fabricated using organic polymers that, in their modified form, are designed to fluoresce in response to specific wavelengths. The emitted fluorescence may be detected for reconstructing the data stored in the recording medium.

The above-noted two-photon writing and readout process is generally described in more detail in the technical paper entitled *Multi-layer Optical Data Storage Based on Two-photon Recordable Fluorescence Disk Media*, by Zhang et al., published 2001 in the Proceedings of the Eighteenth IEEE Symposium on Mass Storage Systems and Technologies, which paper is hereby incorporated by reference as though fully set forth herein. Moreover, specific organic materials that may be used as volumetric two-photon recording media are described in the publication entitled *Materials and Systems for Two Photon 3-D ROM Devices*, by Dvornikov et al., published June 1997 in the IEEE Trans-actions on Components, Packaging and Manufacturing Technology, Part A, Vol. 20, No. 2, which publication is hereby incorporated by reference as though fully set forth herein.

FIG. 1A illustrates an exemplary two-photon recording system in which data may be written at a selected region 130 in a volumetric optical recording medium 100 using two intersecting continuous-wave beams. In this exemplary system, first and second collimated beams 110 and 120 are respectively focused by objective lenses 115 and 125. The focused beams intersect at the selected region 130, where their combined energies are absorbed. In accordance with the two-photon writing process, the absorbed energy induces a physical and/or chemical change in the irradiated region 130, which enables the region to fluoresce or not fluoresce in response to readout beams of particular wavelengths. Data can be written at various regions 130 throughout the medium 100 by selectively actuating the lenses 115 and 125 to intersect the first and second beams at different locations in the medium.

FIG. 1B illustrates an energy diagram corresponding to an exemplary two-photon write process 200 and read process 210. For purposes of discussion, assume that the first beam 110 imparts an energy $E_1$ to the irradiated region 130 and the second beam 120 imparts an energy $E_2$. In the write process 200, the energies of the first and second beams are individually insufficient to span an energy gap between a ground state $S_0$ and a stable excited state $S_2$. However the combined energies of the beams ($E_1+E_2$) is sufficient to span the gap because of the existence of an intermediate unstable state $S_1$ at energy $E_1$. A photon from the first beam 110 excites an electron from the ground state $S_0$ into the intermediate state $S_1$ and, before the electron can "decay" back to state $S_0$, a second photon from the second beam 120 excites the electron to the stable state $S_2$ where its presence constitutes a structural or molecular change which is the written data.

Thereafter, in the read process 210, a readout beam having an energy $E_1$ may excite electrons from the ground state $S_0$ to the excited state $S_1$. When the excited electrons "relax" back to the ground state $S_0$, they emit a fluorescence ($E_F$) that may be detected. In the read process 210, a region 130 that has been structurally modified by the write process 200 emits less fluorescence than those regions of the optical recording medium that were not effected by the write process. More specifically, the amount of fluorescence emitted from the structurally-modified region 130 is reduced because the population of electrons in the ground state $S_0$ has been depleted by the write process which excited ground-state electrons into the stable state $S_2$.

Because of the difficulties associated with aligning two different beams at a point 130, a single-beam approach is preferred, as shown in FIG. 2A. As shown, a collimated beam 112 is focused by a lens 117 to a point 132 in a two-photon recording medium 102. The energy diagrams for this single-beam two-photon recording process are shown in FIG. 2B. In the write process 202, a photon with energy $E_1$ excites an electron to an unstable intermediate state $S_1$. If the beam intensity is sufficient, a second photon of the beam 112 can ionize the state $S_1$ before the electron decays back to the ground state $S_0$. Specifically, the second photon excites the electron from the intermediate state $S_1$ to a dense band of states $S_2$ from which the electron subsequently relaxes to a stable state $S_3$.

Typically, the irradiated region 132 undergoes a structural or molecular change when its electrons are excited from the ground state $S_0$ to the band of states $S_2$ and then relax to the stable energy state $S_3$. Furthermore, the irradiated region can be modified without significantly altering adjacent data layers in the two-photon recording medium 102. In particular, those skilled in the art will understand that only the material volume at the focal point 132 has a significant number of electrons excited out of the ground state $S_0$ and into the elevated energy state $S_3$, since the two-photon absorption probability is proportional to the beam intensity squared, which in turn is inversely proportional to the fourth power of the distance from the focal plane.

The read process 212 may expose the medium 102 with the same beam 112 used in the write process 202, but with a significantly reduced intensity. The read beam excites electrons from the ground state $S_0$ to the unstable intermediate state $S_1$ with a low probability of further exciting them to the band of states $S_2$. As the electrons decay from the intermediate state back to the ground state, they emit a fluorescence ($E_F$) that is detected by a confocal optics system (not shown). In the region 132 that has been written, many of the ground-state electrons are in the state $S_3$, where they are not subject to the stimulated fluorescence. As such, the written region 132 can be detected by the read beam since its amount of emitted fluorescence is less than the detected fluorescence from the non-written (unmodified) regions in the recording medium 102.

Alternatively, the read process 212 can be performed with a read laser having energy $E_3$ that excites electrons from the ground state $S_0$ to a fluorescing state $S_4$. If the beam energy $E_3$ is less than half of the energy $E_2$ required to excite an electron from the ground state $S_0$ to the band of states $S_2$, the read laser will not be able to unintentionally excite electrons into the stable state $S_3$ which would result in a partial write. However, this readout approach requires a read laser, which differs from the write laser 112, to be incorporated into the same optics path through which the write process 202 is performed.

Although two-photon recording provides the possibility of storing thousands of data layers in a volumetric optical recording medium that corresponds to effective areal densities of up to 100 terabits per square inch, two-photon recording is currently limited by spherical aberrations that occur during the writing and reading processes. FIGS. 3A-B illustrate the undesired effects of spherical aberration in a refractive material 330 that may be used as a two-photon recording medium. FIG. 3A illustrates a collimated laser beam 300 that is focused by an objective lens 310 to a spot 320. FIG. 3B illustrates the same optical configuration, except the lens 310 converges the beam 300 to a spot 340 within the refractive material 330. In this case, spherical aberration in the refractive material 330 causes the focused spot 340 to "spread" to a larger diameter than it would otherwise exhibit in the absence of the material 330. Thus, the spherical aberration inherently limits the ability to focus the incident beam 300 within the refractive material.

Referring again to FIG. 1A, spherical aberration in the two-photon recording medium 100 may prevent the first and second beams 110 and 120 from being sharply focused at the selected region 130. As such, the first and second beams may not impart a sufficient amount of energy ($E_1+E_2$) to induce the intended structural or molecular change in the irradiated region 130. Similarly, spherical aberration in the single-beam system of FIG. 2A also may limit the ability of the write beam 112 to excite electrons to the stable state $S_3$ via the band of states $S_2$. Additionally, the spherical aberration also may prevent a readout laser from being focused sharply enough to impart a sufficient amount of energy to induce fluorescence during the readout processes 210 and 212.

The above-noted writing and readout limitations caused by spherical aberration are compounded by the inherent difficulty of removing the aberration at different depths in an optical recording medium. As is known in the art, the amount of spherical aberration is typically depth dependent, such that even when correction occurs for aberration at one focal depth, the correction does not prevent spherical aberration in various degrees at other focal depths. The depth dependence of spherical aberration therefore limits the volume in which data can be effectively written or read back without active changes in the system to essentially offset the aberration. Typically, the useful depth range in a conventional two-photon recording medium is only about 1 millimeter. That is, data can be effectively stored in data layers situated within about a millimeter of a focal plane before spherical aberration becomes prohibitive to the write and read processes even with use of known techniques for correcting spherical aberrations.

There are many well-known techniques that correct for spherical aberration when focusing at different physical depths in a volumetric optical data storage medium, such as a two-photon recording medium. The techniques generally involve actively repositioning or adjusting system components that are dedicated to the correction of the spherical aberration. Accordingly, the system requires separate actuations for focusing and for removing spherical aberration.

For example, consider U.S. Pat. No. 5,202,875 to Rosen. As is typical, the Rosen recording system includes a focus servo that actuates an objective lens in the optical path so as to minimize a detected focus error signal. By moving the objective lens in this fashion, light may be focused at a plurality of discrete information layers in a storage medium. To correct for spherical aberration introduced by the act of focusing, Rosen separately actuates a "multiple data surface aberration compensator" that actively adjusts by discrete levels the amount of refractive material added to the optical path. In this manner, the compensator can be used to select among several thicknesses of refractive material for insertion in the optical path in order to offset spherical aberration introduced when changing focal planes from one recording layer to another.

Other known aberration correction techniques insert stationary optical elements into the optical path. For instance, U.S. Pat. No. 6,795,248 to Kimura teaches insertion of a stationary aberration-compensating element having a diffractive structure that includes concentric gratings designed to offset spherical aberration before incident light is focused in an optical recording medium. Solutions that utilize stationary optical elements, such as Kimura's diffractive structure, typically do not remove the spherical aberration over a range of focal depths, but merely attempt to reduce it to an acceptable level at various depths. Indeed, the stationary aberration-correcting elements are often designed primarily to correct for chromatic aberration, and correction for spherical aberration is a secondary concern.

It is therefore generally desirable to provide an improved technique for correcting for spherical aberration in a volumetric optical data storage medium, such as a two-photon recording medium. The technique should avoid separate actuations for focusing and correcting for spherical aberration. Further, the technique should reduce spherical aberration more effectively at various depths than is possible using conventional stationary compensation elements. The technique should not only correct for spherical aberration at discrete recording layers, but also over a continuous spectrum of depths.

SUMMARY OF THE INVENTION

The present invention overcomes the disadvantages of the prior art by providing a system and method for adjusting a depth of focus over a continuous range of depths in a refractive material without introducing spherical aberration as a result of the focal adjustments. To that end, the system and method provide a novel optical path in which a ramped prism is situated between an objective lens and a refractive material, such as an optical recording medium. The bottom surface of the prism is positioned parallel to and in close proximity with the top surface of the recording medium, and the refractive index of the prism is preferably selected to substantially match the refractive index of the recording medium. The objective lens and, as appropriate, one or more associated mirrors are positioned so that light exiting the lens is directed along an optic axis that is oriented substantially perpendicular with respect to the ramped top surface of the prism.

In operation, light passes through the objective lens, which is corrected for spherical aberration at a fixed depth, and is then focused at a fixed optical depth in the refractive block consisting of the prism and recording medium. The objective lens and other optics in the optical path may be moved up or down the prism ramp to change the prism thickness in the optical path, thereby adjusting the physical depth of focus in the recording medium. However, since the optical depth of focus in the refractive block consisting of the prism and recording medium remains constant with changes in the physical focal depth in the recording medium, additional spherical aberration is not introduced as a result of changing the physical focal depth in the recording medium.

Known optical elements, such as hemispherical correction lenses and the like, may be used to correct the spherical aberration at the fixed optical focal depth in the refractive block consisting of the prism and recording medium. When the physical depth of focus in the recording medium is thereafter altered by moving the optical element to change the prism thickness in the optical path, the spherical aberration correction need not change, since the optical focal depth in the refractive block remains fixed. Preferably, the distance between the optical element and the prism is kept constant even as the optical element moves to adjust the thickness of the prism in the optical path, which ensures that the optical depth of focus in the refractive block also remains constant.

The novel optical arrangement may be implemented in an illustrative optical data storage system. The data storage system includes an optical head that outputs light which is then directed along an optic axis oriented substantially perpendicular relative to a ramped top surface of a triangular prism. The bottom surface of the prism is positioned parallel to and in close proximity with an optical recording medium. The prism and recording medium are preferably selected to have substantially the same refractive indices, such that a refractive block consisting of the prism and recording medium has a constant refractive index.

Further to the illustrative optical data storage system, the optical head includes a light source and an objective lens corrected for spherical aberration at a fixed depth D in the refractive block consisting of the triangular prism and the optical recording medium. The light generated by the light source is focused by the objective lens, and the resulting convergent light is output from the optical head. After exiting the head, the convergent light is focused at the known depth (D) in the refractive block consisting of the triangular prism and the optical recording medium. In particular, the convergent light is directed through a selected thickness (d) of the triangular prism and is focused at a depth D-d in the recording medium.

The optical head may be actuated circumferentially along the ramped top surface of the prism, in order to vary the location and depth of the focal point in the recording medium. Specifically, as the head is actuated up or down the ramped top surface, the prism thickness d is changed in the optical path, and thus the physical depth of focus D-d in the recording medium is likewise adjusted. To access different tracks, the head is actuated radially on the top surface of the prism. The recording medium is preferably configured to spin beneath the prism so that the optical head can access the length of each circumferential data track on the medium.

Advantageously, by moving the optical head up or down the prism's ramped top surface, and thereby changing the relative thicknesses of d and D-d, the physical depth of focus in the optical recording medium can be readily adjusted over a continuous spectrum of depths, without requiring separate adjustments to correct for spherical aberration. The system and method of the present invention may be used in a variety of different types of optical systems including, but not limited to, two-photon recording systems, holographic recording systems as well as other multi-level or volumetric optical recording systems.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1A:
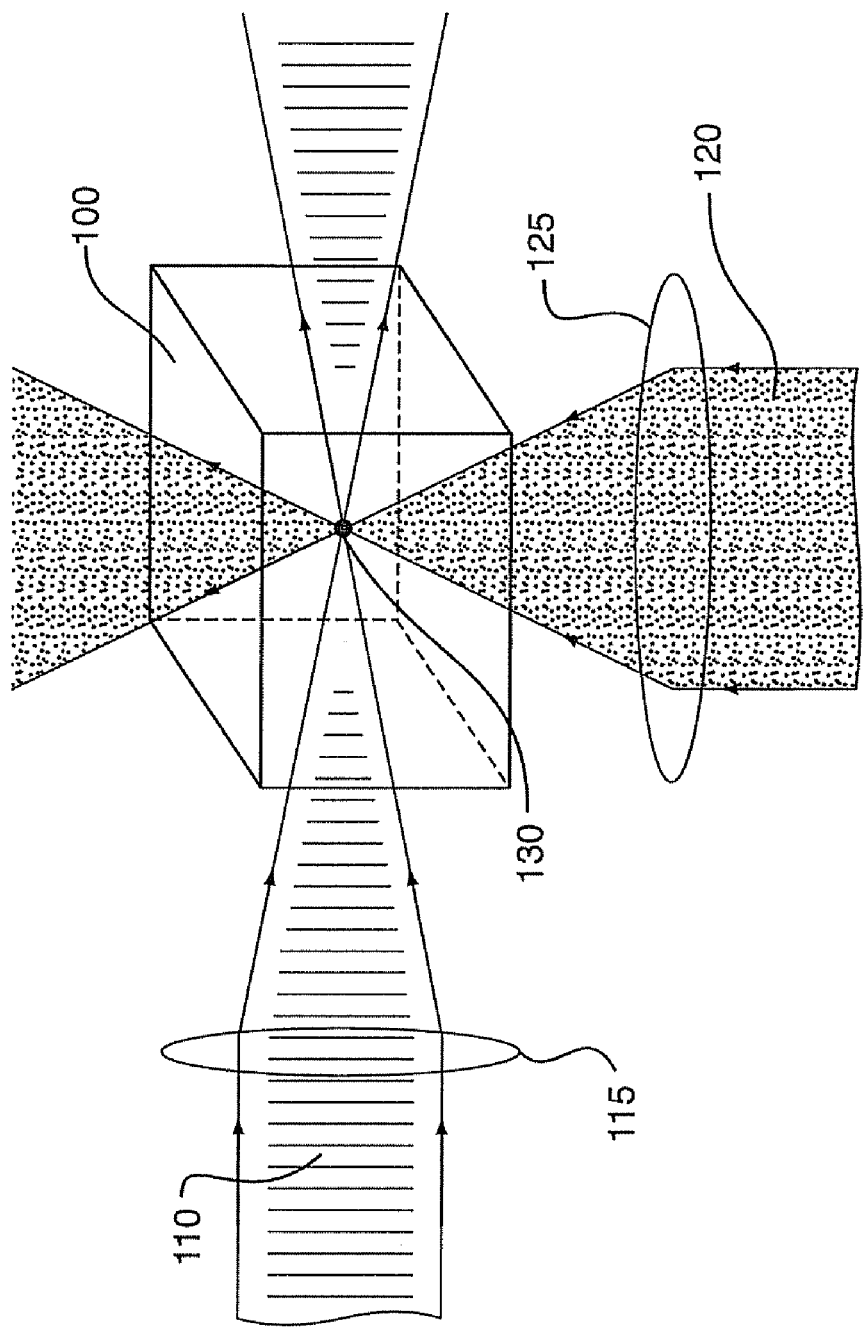
FIG. 1A, previously described, is a schematic diagram of a two-photon recording process in which two light sources are used to write data in a two-photon recording medium.
Figure 1B:
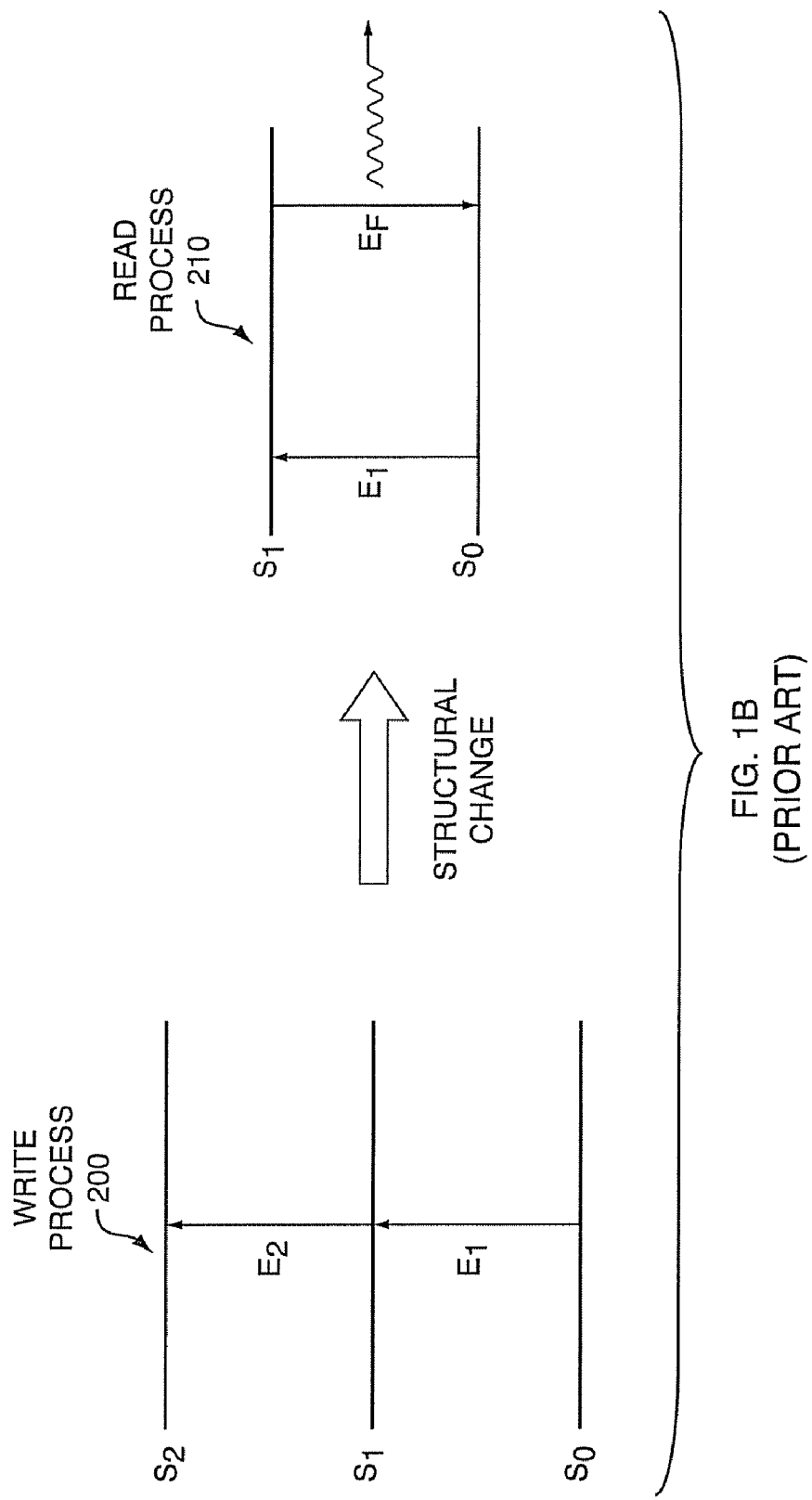
FIG. 1B, previously described, is a schematic diagram of different energy levels that may characterize exemplary two-beam write and read processes.
Figure 2A:
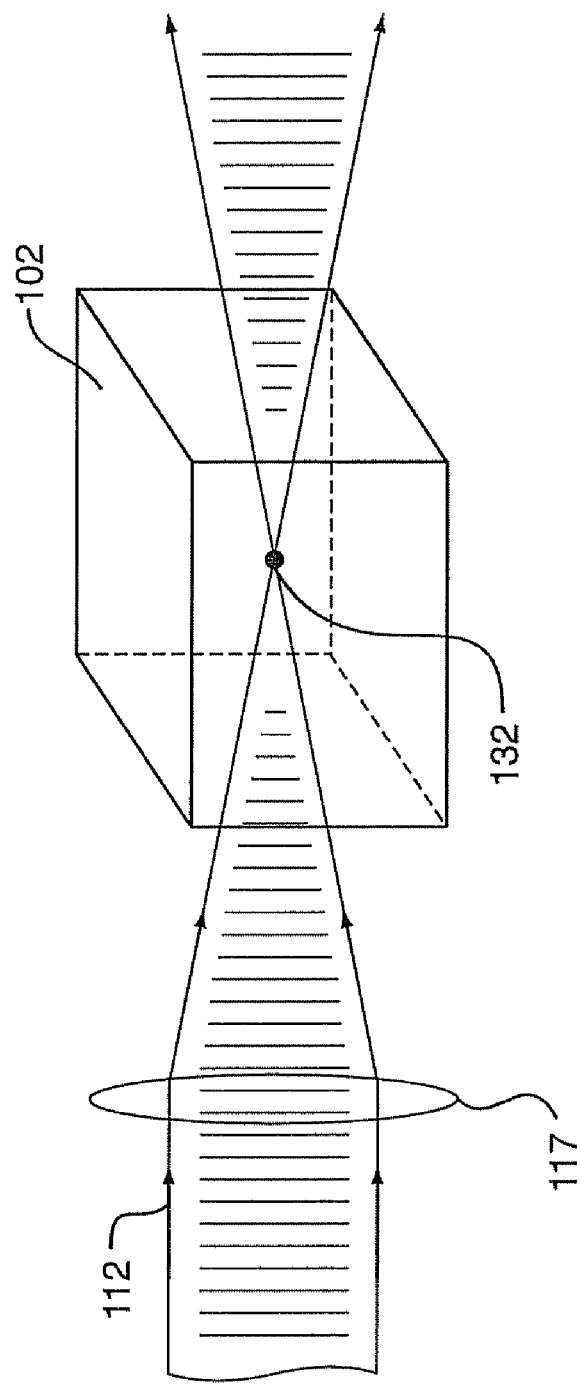
FIG. 2A, previously described, is a schematic diagram of a two-photon recording process in which one light source is used to write data in a two-photon recording medium.
Figure 2B:
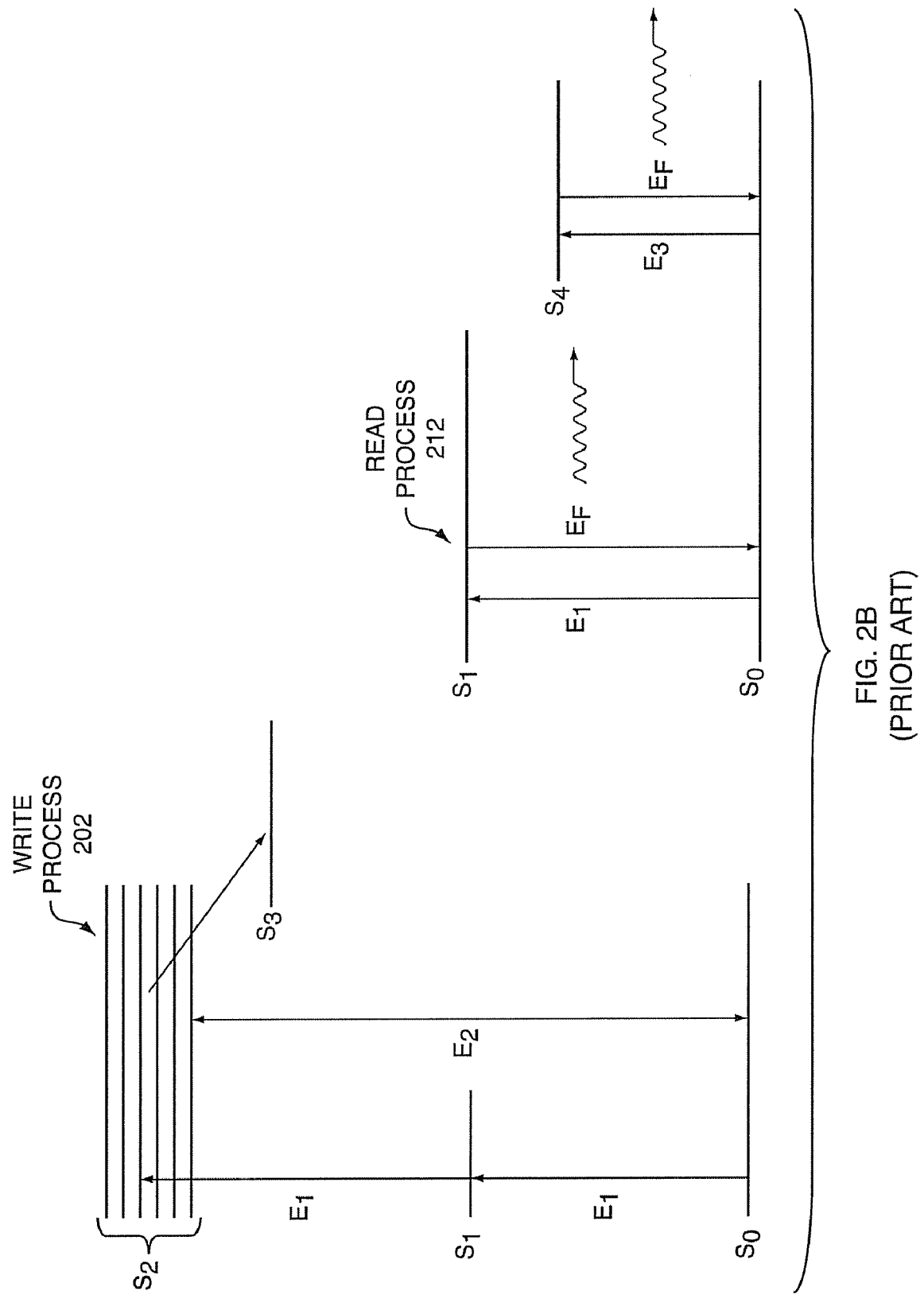
FIG. 2B, previously described, is a schematic diagram of different energy levels that may characterize exemplary single-beam write and read processes.
Figure 3B:
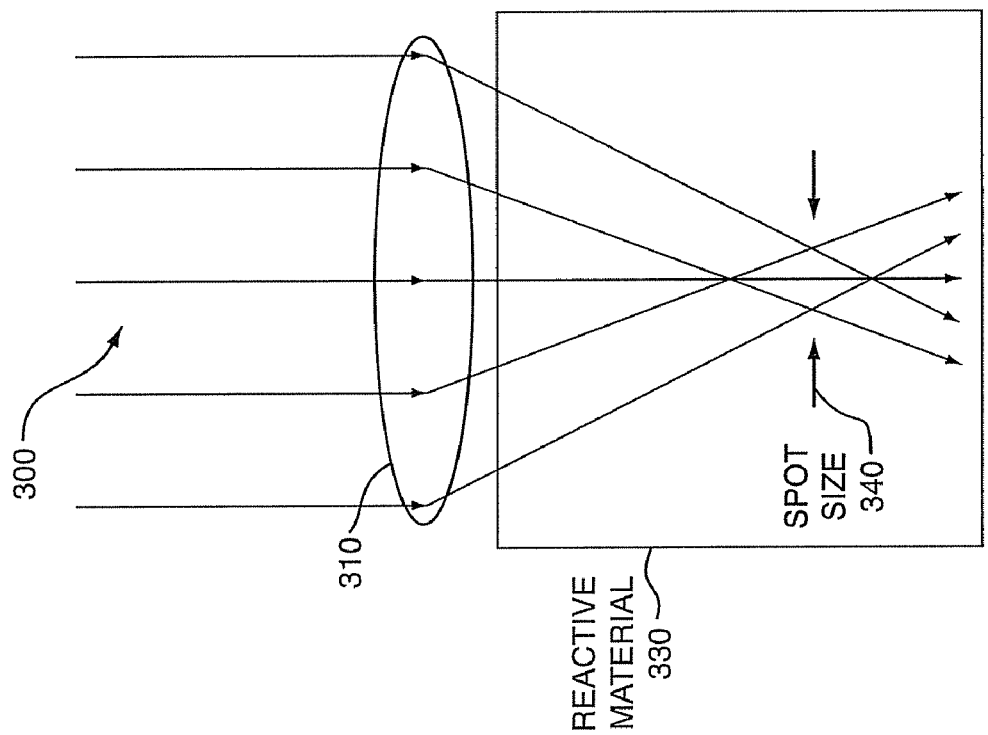
FIG. 3B, previously described, is a schematic diagram illustrating spherical aberration that results when the objective lens is used for focusing the collimated light in a refractive material.
Figure 3A:
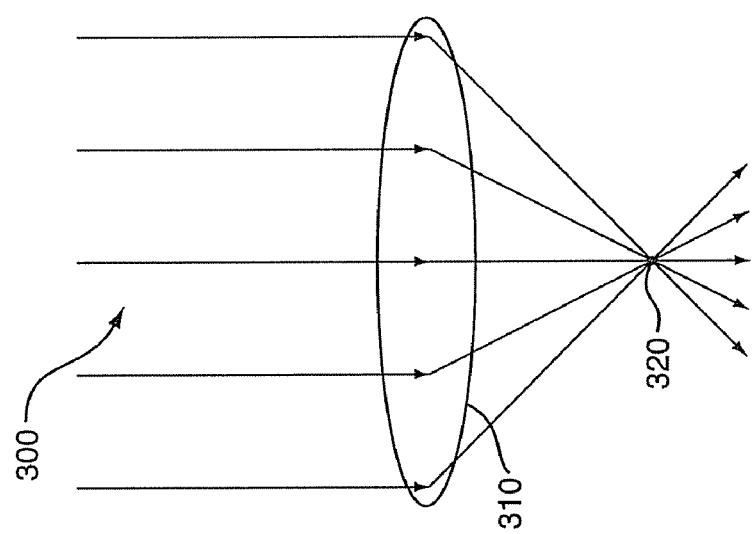
FIG. 3A, previously described, is a schematic diagram of an objective lens that focuses collimated light to a diffraction-limited spot.
Figure 4:
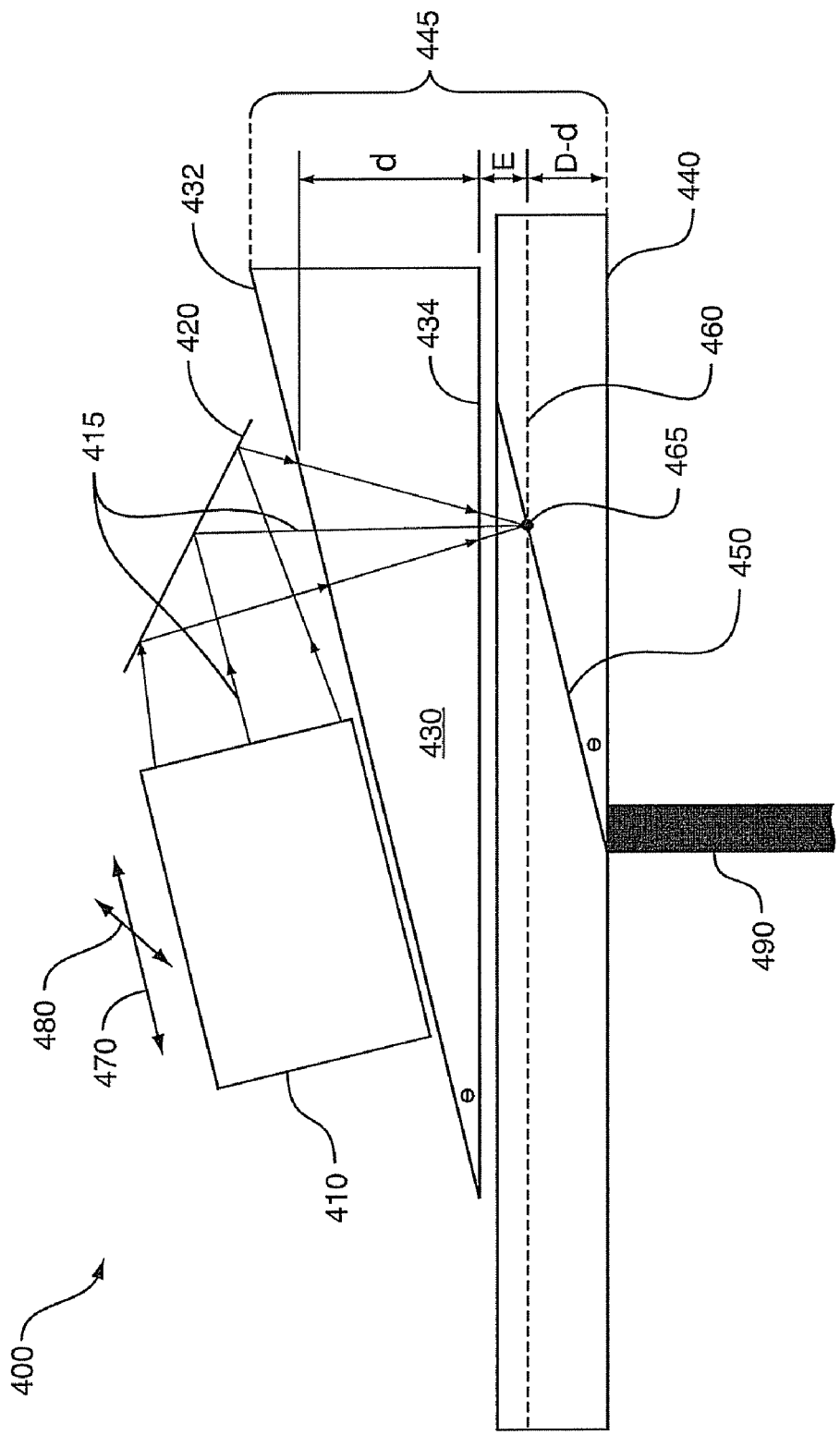
FIG. 4 is a schematic diagram of an exemplary embodiment of the invention in which light may be selectively focused over a continuous range of depths in a volumetric optical recording medium without introducing spherical aberration as a result of the focal depth adjustments.

FIG. 4 illustrates a preferred embodiment of the invention applied to an exemplary optical data storage system 400 that employs the novel optical arrangement for changing depths of focus in a volumetric optical recording medium without introducing additional spherical aberration as a result of the focal adjustment. In this exemplary system, two-photon recording is effectuated with an optical head 410 that operates with a single laser source (not shown). Those skilled in the art will appreciate that the system alternatively may utilize two intersecting continuous-wave beams from separate sources. For instance, an alternate embodiment may employ separate optical heads, e.g., mounted above and below the optical recording medium 440, which are adapted to output intersecting continuous-wave beams.

The optical head 410 focuses light at a fixed optical depth (D) in a refractive block 445 consisting of the prism 430 and the recording medium 440. The triangular prism has a ramped top surface 432 and a bottom surface 434 which is positioned parallel to and within a relatively close distance $\epsilon$ to the recording medium 440. The prism 430 and recording medium 440 are preferably selected to have substantially the same refractive indices. The separation $\epsilon$ between the prism and recording medium is selected to be relatively small, such that the prism and recording medium essentially constitute a single, unitary refractive block 445. In a preferred embodiment, the recording medium is mounted on a rotating spindle 490.

The optical head 410 may include, inter alia, a light source and further may include one or more objective lenses that are positioned at a fixed distance relative to the top prism surface 432 and correct for spherical aberration at a fixed focal depth D in the refractive block 445. For example, the optical head may include the objective lens 500 or the lenses 600 and 610 to correct for spherical aberration at the fixed focal depth, as described in more detail below with reference to FIGS. 5 and 6. For purposes of illustration, the light source and objective lens(es) are not explicitly shown in the optical head 410. The optical head also may include other instrumentation, such as optics, detectors and actuators for implementing focus and tracking servo controls. The light source may be a semiconductor laser or the like mounted within the head 410. Alternatively, the light source may be a pulsed or continuous-wave laser, whose output is coupled into the head.

The light output from the optical head 410 is directed along an optic axis 415, which may be redirected by a mirror 420 mounted on the ramped top surface 432 of the prism. The mirror is positioned at a fixed angle which is chosen to redirect the optic axis in a direction that is substantially perpendicular relative to the top surface of the prism. Further to the illustrative embodiment, the mirror is further positioned to ensure that the convergent light exiting the optical head traverses a second air gap having a distance G, i.e., equal to the distance of the first air gap G located within the optical head. To that end, the mirror 420 is preferably positioned at a fixed distance from the optical head 410, and is actuated together with the head to ensure their constant spacing. Notably, the mirror may be unnecessary if the optical head 410 can be positioned to output light in a direction that is substantially perpendicular relative to the top surface 432 of the prism.

The convergent light output from the optical head 410 is eventually focused at a known depth D in the refractive block 445 consisting of the triangular prism 430 and the optical recording medium 440. In particular, the light propagates through the thickness d of the prism, across the air gap $\epsilon$, and is focused to a point 465 at a depth D-d-$\epsilon$ in the recording medium. Because the distance $\epsilon$ is chosen to be relatively small compared with the distance D-d, the physical depth of focus in the recording medium 440 can be approximated as D-d.

Figure 7:
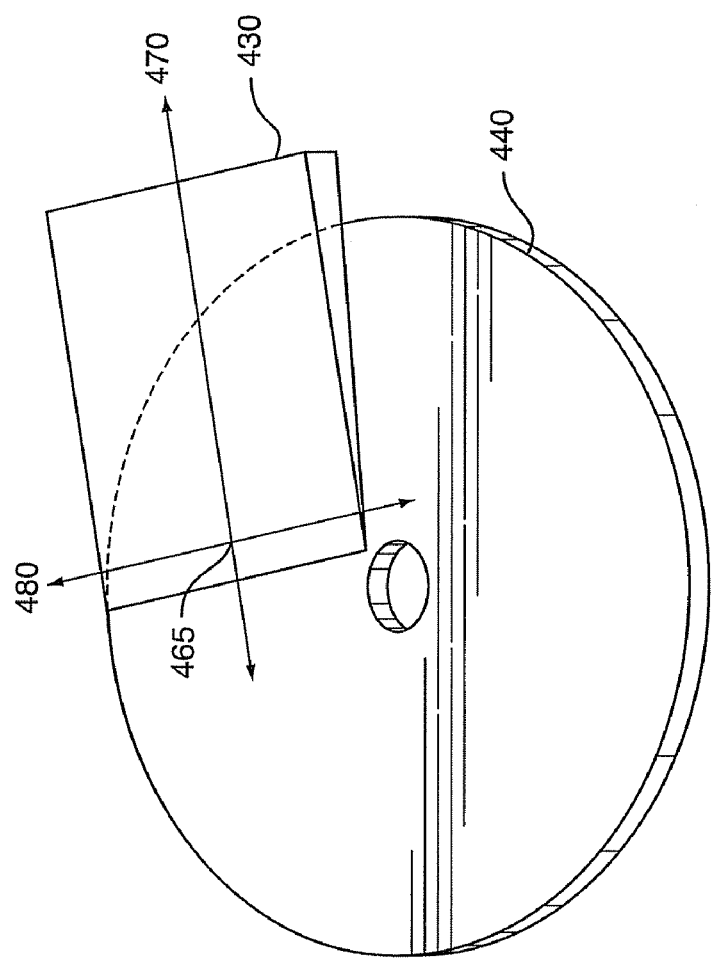
FIG. 7 is a schematic diagram illustrating a focused spot that may be selectively displaced within the volume of an optical recording medium in accordance with the exemplary embodiment of the invention depicted in FIG. 4.

To vary the location and depth of the focal point 465 in the recording medium 440, the optical head 410 may be actuated in the circumferential direction 470. To access different tracks, the head may be actuated in the radial direction 480 along the top surface of the prism 430. FIG. 7 illustrates a perspective top view of the focused spot 465 relative to the prism 430 and optical recording medium 440. Preferably, the optical head 410 and mirror 420 are actuated as a single assembly, thereby ensuring that the mirror remains at a fixed distance relative to the head. For example, circumferential and radial stepper motors (not shown) may be used to selectively position the optical head and mirror assembly (or "optical plant") along the top surface of the prism. Moreover, the prism also may be mounted on one or more displacement stages that circumferentially displace the prism relative to the top surface of the recording medium while maintaining a fixed separation between the head assembly 410 and the prism 430.

As the optical plant is displaced circumferentially, the prism thickness d in the optical path changes, which in turn changes the physical depth of focus D-d in the recording medium. Thus, a circumferential displacement of the optical plant repositions the focal plane 460 along a trajectory 450 that runs parallel with the top surface of the prism. In accordance with the illustrative embodiment, the optical depth of focus D in the refractive block consisting of the prism and the recording medium remains constant, even as the optical plant is displaced circumferentially to adjust the physical depth of focus D-d in the recording medium. Accordingly, the focused spot 465 can be repositioned along the trajectory 450 without introducing added spherical aberration.

In order to stay "on track" as the optical recording medium 440 rotates during a read process or, as appropriate, a write process, rapid small adjustments of both the radial position and the focal depth can be made by tilting the mirror 420 with one or more piezoelectric or electromagnetic actuators (not shown). Once the optical head has been positioned to focus on a concentric data track in the recording medium 440, the string of bits recorded on the track may be detected by the head as the medium rotates beneath the prism.

Figure 5:
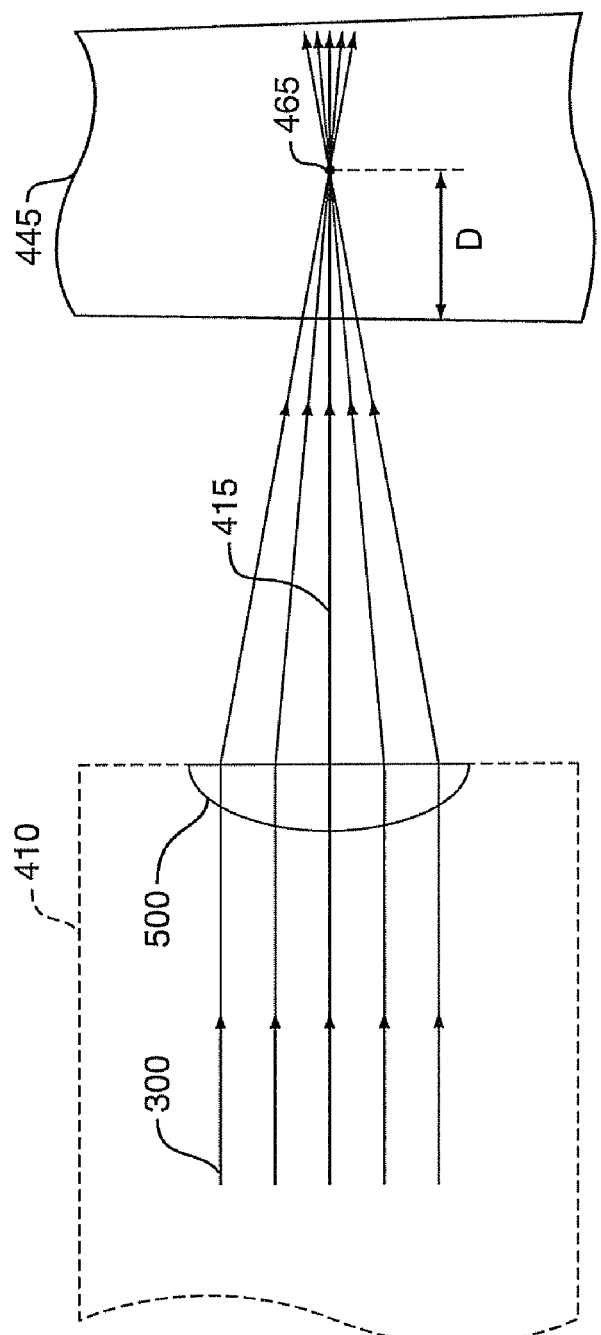
FIG. 5 is a schematic diagram illustrating an optical arrangement for correcting spherical aberration at a fixed depth with a lens having a thickness profile customized to cause a sharp focus at a fixed depth.

The optical head 410 may contain various optical arrangements for focusing light at a fixed optical depth in the refractive block 445 consisting of the prism 430 and recording medium 440. For example, FIG. 5 illustrates a lens 500 that may be incorporated into or otherwise coupled with the optical head 410. The lens is designed to focus collimated light 300 at a fixed focal depth and correct for spherical aberration at that fixed depth. As shown, the lens 500 focuses the light to a point 465 in the refractive block 445. For ease of illustration, it is assumed that the spacing $\epsilon$ in the refractive block 445 is substantially small so that the prism 430 (FIG. 4) and optical recording medium 440 (FIG. 4) essentially function as a single block of refractive material. The lens 500 is constructed having a customized thickness profile that sharply focuses the incident light 300 at a fixed optical depth D in the refractive block 445. This profile may be designed to accomplish this in the presence of a fixed separation, such as an air gap, situated between the lens 500 and the refractive block 445. In this embodiment, the mirror 420 is not necessary since the optic axis 415 of the optical head 410 is already oriented substantially perpendicular to the ramped top surface of the refractive block.

Figure 6:
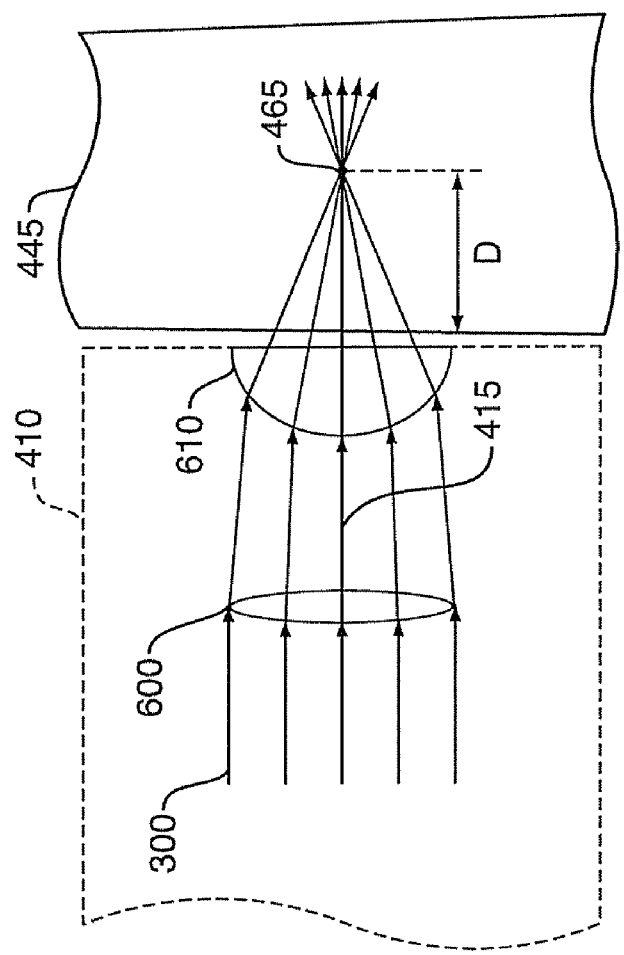
FIG. 6 is a schematic diagram illustrating an optical arrangement for correcting spherical aberration at a fixed depth with a conventional uncorrected objective lens and a hemispherical correction lens.

FIG. 6 illustrates yet another optical arrangement that may be employed by the optical head 410. Here, the optical head 410 includes a conventional uncorrected objective lens 600 that converges the incident light 300 on a hemispherical correction lens 610, which in turn focuses the light at a fixed optical depth D in the refractive block 445. Again, the mirror 420 is not necessary since the optic axis 415 of the optical head 410 is already directed substantially perpendicular to the ramped top surface of the refractive block.

More generally, the optical head 410 may employ various optical arrangements for focusing light at a fixed optical depth in the refractive block 445 consisting of the prism 430 (FIG. 4) and the optical recording medium 440 (FIG. 4). Regardless of which optical arrangement is employed, the optic axis 415 is oriented perpendicularly with respect to the top surface 432 of the prism, and the optic axis may be redirected by one or more mirrors 420 to achieve this preferred orientation.

Unlike prior optical data storage systems, the illustrative embodiment performs only a single actuation of the optical head 410 for changing the physical depth of focus in the optical recording medium 440 and for correcting for spherical aberration. More specifically, by performing a single actuation to move the optical head up or down the prism's ramped top surface, thereby changing the relative thicknesses of d and D-d, the physical depth of focus in the optical recording medium can be readily adjusted over a continuous spectrum of depths, without requiring separate adjustments to correct for spherical aberration. The novel arrangement minimizes spherical aberration over a continuum of focal depths and a wider range of focal depths more effectively than is possible using conventional stationary optical elements.

The foregoing has been a detailed description of illustrative embodiments of the invention. Various modifications and additions can be made without departing from the spirit and scope of the invention. For example, the triangular prism 430 may be embodied in other polygonal shapes in which displacement of the optical head relative to the prism results in a change in prism thickness in the optical path. Also, the system and method of the present invention may be used in a variety of different types of optical systems including, but not limited to, two-photon recording systems, holographic recording systems as well as other multi-level or volumetric optical recording systems. Further, the novel optical arrangement may be deployed in other optical systems, in addition to recording systems, where multi-level or volumetric focusing is required.

Although the volumetric optical recording medium 440 in the illustrative recording system 400 is mounted on a rotating spindle 490, those skilled in the art will appreciate that the principles of the present invention are equally applicable in optical recording systems having stationary recording media. Further, although the prism 430 may be actuated to adjust the range of physical focal depths that may be realized in the recording medium 440, the prism also may remain stationary in those embodiments where the prism geometry and system configuration enable actuations of the optical head 410 to adjust the physical depth of focus in the recording medium over a desired range of depths. The novel optical arrangement may be used for changing focal depths when reading or writing data in a volumetric optical recording medium, such as two-photon recording medium. Accordingly, this description is meant to be taken only by way of example and not to otherwise limit the scope of the invention.

What is claimed is:

1. An optical system, comprising:
a refractive material;
a prism having a ramped top surface and a bottom surface, the bottom surface of the prism being positioned parallel to and in close proximity with the refractive material;
an optical head assembly adapted to focus light at a fixed optical depth in a refractive block consisting of the prism and the refractive material; and
means for selectively displacing the optical head assembly circumferentially along the ramped top surface of the prism to adjust a physical depth of focus in the refractive material.

2. The optical system of claim 1, wherein the optical head assembly further includes:
an optical head configured to generate and output light; and
a mirror positioned relative to the optical head to redirect the light output by the optical head such that an optic axis of the light is oriented substantially perpendicular relative to the ramped top surface of the prism.

3. The optical system of claim 2, wherein the optical head and mirror are actuated as a single assembly along the ramped top surface of the prism.

4. The optical system of claim 1, wherein the optical head assembly further includes:
an optical head configured to generate light such that an optic axis of the light is oriented substantially perpendicular relative to the ramped top surface of the prism.

5. The optical system of claim 1, wherein the optical head assembly includes means for focusing light at the fixed optical depth in the refractive block consisting of the prism and the refractive material.

6. The optical system of claim 1, further comprising means for selectively displacing the optical head assembly radially along the ramped top surface of the prism.

7. The optical system of claim 1, wherein the refractive material has a first refractive index and the prism has a second refractive index that is substantially equal to the first refractive index.

8. The optical system of claim 1, wherein the refractive material is a two-photon recording medium and the optical system is a two-photon recording system.

9. The optical system of claim 1, wherein the means for selectively displacing the optical head assembly circumferentially along the ramped top surface of the prism further comprises:
a stepper motor for displacing the optical head assembly along the ramped top surface of the prism.

10. The optical system of claim 1, further comprising:
one or more displacement stages adapted to displace the prism relative to the refractive material.

11. A method for focusing light in a refractive material without introducing spherical aberration as a result of the focal adjustment, the method comprising:
positioning a prism having a ramped top surface and a bottom surface between an optical head assembly and the refractive material, the bottom surface of the prism being positioned parallel to and in close proximity with the refractive material;
focusing light at a fixed optical depth in a refractive block consisting of the prism and the refractive material; and
selectively displacing the optical head assembly circumferentially along the ramped top surface of the prism to adjust a physical depth of focus in the refractive material.

12. The method of claim 11, further comprising:
directing light output from the optical head assembly such that an optic axis of the light is oriented substantially perpendicular relative to the ramped top surface of the prism.

13. The method of claim 12, further comprising:
generating light at an optical head in the optical head assembly; and
directing the light generated by the optical head such that an optic axis of the redirected light is oriented substantially perpendicular relative to the top surface of the prism.

14. The method of claim 11, further comprising:
selectively displacing the optical head assembly radially along the ramped top surface of the prism.

15. The method of claim 11, further comprising:
selectively displacing the prism relative to the refractive material.

16. The method of claim 11, further comprising:
selecting the refractive index of the prism to substantially match the refractive index of the refractive material.

* * * * *

UNITED STATES PATENT AND TRADEMARK OFFICE
CERTIFICATE OF CORRECTION

PATENT NO. : 7,593,305 B1 Page 1 of 1
APPLICATION NO. : 11/352691
DATED : September 22, 2009
INVENTOR(S) : Michael Mallary It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 697 days.

Signed and Sealed this

Twenty-first Day of September, 2010

David J. Kappos
*Director of the United States Patent and Trademark Office*